US012615092B2

(12) United States Patent
Koehler-Sidki et al.

(10) Patent No.: US 12,615,092 B2
(45) Date of Patent: Apr. 28, 2026

(54) OPTICAL SWITCHING FOR QUANTUM KEY DISTRIBUTION

(71) Applicant: Arqit Limited, London (GB)

(72) Inventors: Alexander Koehler-Sidki, Cambridgeshire (GB); Ryan Parker, Essex (GB); Omar Iqbal, Hampshire (GB)

(73) Assignee: Arqit Limited, London (GB)

( * ) Notice: Subject to any disclaimer, the term of this patent is extended or adjusted under 35 U.S.C. 154(b) by 272 days.

(21) Appl. No.: 18/702,245

(22) PCT Filed: Sep. 28, 2022

(86) PCT No.: PCT/GB2022/052456
§ 371 (c)(1),
(2) Date: Apr. 17, 2024

(87) PCT Pub. No.: WO2023/067298
PCT Pub. Date: Apr. 27, 2023

(65) Prior Publication Data
US 2025/0233671 A1     Jul. 17, 2025

(30) Foreign Application Priority Data

Oct. 18, 2021    (GB) ..................................... 2114868

(51) Int. Cl.
*H04B 10/60*          (2013.01)
*H04B 10/70*          (2013.01)

(52) U.S. Cl.
CPC ............. *H04B 10/60* (2013.01); *H04B 10/70* (2013.01)

(58) Field of Classification Search
CPC ... H04B 1/02; H04B 1/03; H04B 1/06; H04B 1/10; H04B 1/16; H04B 1/3816;
(Continued)

(56) References Cited

U.S. PATENT DOCUMENTS

| | | | |
|---|---|---|---|
| 8,270,841 B2 * | 9/2012 | Nishioka | H04B 10/70 380/278 |
| 8,929,554 B2 * | 1/2015 | Hughes | H04L 9/0852 380/263 |

(Continued)

FOREIGN PATENT DOCUMENTS

| | | | | |
|---|---|---|---|---|
| EP | 3308478 B1 * | 4/2020 | ..........| H04L 9/0852 |
| GB | 2605192 | 9/2022 | | |

(Continued)

OTHER PUBLICATIONS

Lijun Ma et al., "High Speed Quantum Key Distribution Over Optical Fiber Network System," Feb. 17, 2009, Journal of Research of the National Institute of Standards and Technology, vol. 114, No. 3, May-Jun. 2009, pp. 149-170.*

(Continued)

*Primary Examiner* — Omar S Ismail
(74) *Attorney, Agent, or Firm* — Dentons US LLP

(57)          ABSTRACT

A system and method for operating a quantum key distribution system including a receiver to receive an optical signal from a transmitter, the receiver including a first signal detection unit (1SDU) and a second signal detection unit (2SDU) for detecting events associated with single photons; an optical switch to alternate between a first switch position to direct a received optical signal to the 1SDU and a second switch position to direct a received optical signal to the 2SDU, such that the 1SDU and the 2SDU correspond to the first and second switch positions respectively; a detection time tagger to tag the events at the 1SDU and the 2SDU according to time, switch position, and signal detection unit, to introduce a correlation between a time in which an event is registered, the switch position, and the signal detection unit; and a timing recovery module connected to the detection time tagger.

24 Claims, 4 Drawing Sheets

(58) Field of Classification Search

CPC .......... H04B 1/3827; H04B 1/40; H04B 1/38; H04B 1/62; H04B 1/707; H04B 1/7075; H04B 1/7073; H04B 1/709; H04B 1/7097; H04B 1/7103; H04B 1/711; H04B 1/7115; H04B 1/713; H04B 1/7163; H04B 3/02; H04B 3/04; H04B 3/20; H04B 3/06; H04B 3/10; H04B 3/16; H04B 3/32; H04B 3/36; H04B 3/46; H04B 3/462; H04B 3/54; H04B 5/20; H04B 5/70; H04B 5/40; H04B 5/24; H04B 7/02; H04B 7/022; H04B 7/04; H04B 7/14; H04B 7/15; H04B 7/24; H04B 10/03; H04B 10/07; H04B 10/11; H04B 10/25; H04B 10/27; H04B 10/40; H04B 10/50; H04B 10/60; H04B 10/80; H04B 15/02; H04B 14/02; H04B 17/10; H04B 17/20; H04B 17/30; H04B 17/11; H04B 17/15; H04B 17/309; H04B 10/70

See application file for complete search history.

(56) References Cited

U.S. PATENT DOCUMENTS

| | | | | |
|---|---|---|---|---|
| 9,287,994 | B2 * | 3/2016 | Nordholt | H04K 1/08 |
| 9,866,379 | B2 * | 1/2018 | Nordholt | H04B 10/70 |
| 9,998,217 | B2 * | 6/2018 | Li | H04B 10/1125 |
| 10,305,603 | B2 * | 5/2019 | Dar | H04B 10/6166 |
| 12,015,700 | B2 * | 6/2024 | Stack | H04L 9/0858 |
| 2012/0063596 | A1 * | 3/2012 | Brodsky | H04L 9/0858 |
| | | | | 380/256 |
| 2012/0177201 | A1 * | 7/2012 | Ayling | H04L 9/0858 |
| | | | | 380/278 |
| 2015/0236791 | A1 * | 8/2015 | Nordholt | H04B 10/501 |
| | | | | 398/184 |
| 2015/0288476 | A1 * | 10/2015 | Ashrafi | H04W 12/041 |
| | | | | 398/79 |
| 2016/0094297 | A1 * | 3/2016 | Xie | H04L 7/027 |
| | | | | 398/202 |
| 2016/0226598 | A1 * | 8/2016 | Zhao | G09C 1/00 |
| 2016/0337032 | A1 * | 11/2016 | Johnson | H04B 10/70 |
| 2016/0380765 | A1 * | 12/2016 | Hughes | H04B 10/70 |
| | | | | 380/256 |
| 2017/0026095 | A1 * | 1/2017 | Ashrafi | H04B 7/10 |
| 2020/0067704 | A1 * | 2/2020 | Zbinden | H04B 10/07953 |
| 2021/0119786 | A1 * | 4/2021 | Bucklew | H04L 9/0852 |
| 2021/0119788 | A1 * | 4/2021 | Wang | H04B 10/70 |
| 2021/0152355 | A1 * | 5/2021 | Karunakaran | H04B 10/25891 |
| 2022/0173895 | A1 * | 6/2022 | Lord | H04L 9/08 |
| 2023/0275752 | A1 * | 8/2023 | Woodward | H04L 9/3242 |
| | | | | 713/168 |

FOREIGN PATENT DOCUMENTS

| | | | | |
|---|---|---|---|---|
| JP | 2010166285 A * | 7/2010 | | |
| WO | 2006026004 | 3/2006 | | |
| WO | WO-2010092776 A1 * | 8/2010 | .......... | H04J 14/0305 |
| WO | 20140183158 | 11/2014 | | |

OTHER PUBLICATIONS

R Valivarthi et al., "Measurement-device-independent quantum key distribution coexisting with classical communication," Jul. 30, 2019, Quantum Sci. Technol. 4 (2019), pp. 1-6.*

Thiago Ferreira da Silva et al., "Real-time monitoring of single-photon detectors against eavesdropping in quantum key distribution systems," Aug. 2, 2012, Optics Express, vol. 20, No. 17, pp. 18916-18922.*

V. L. Kurochkina et al., "Using Single-Photon Detectors for Quantum Key Distribution in an Experimental Fiber-Optic Communication System," May 19, 2009, Optoelectronics, Instrumentation and Data Processing vol. 45, No. 4 2009, pp. 374-378.*

Search Report GB Application No. 2114868.9 dated Mar. 28, 2023.

\* cited by examiner

OPTICAL SWITCHING FOR QUANTUM KEY DISTRIBUTION

This application is the National Stage filing under 35 U.S.C. 371 of International Application No. PCT/GB2022/052456, filed Sep. 28, 2022, claims the benefit of GB Application No. 2114868.9, filed Oct. 18, 2021, the contents of which are all hereby incorporated by reference herein in their entirety.

TECHNICAL FIELD

The present application relates to a method, system and software for operating a quantum key distribution (QKD) system.

BACKGROUND

Cryptography is used to protect communications and transactions every day, including ultra-secure government communications, and Transport Layer Security (TLS) security for online shopping and banking, for example. These transactions rely on reliable and secure means for at least two or more transacting parties to share a secret key, enabling encryption of data by one party and subsequent decryption by other parties.

It is expected that when commercially usable universal quantum computers (QC) become available, a variety of types of transactions, tasks and applications including conventional key distribution processes will be vulnerable. QCs can potentially crack many classical cryptography codes almost effortlessly. Conventional key distribution processes are not quantum secure by their nature of operation, as they are exposed to both quantum electronic and/or physical compromise.

It has been proposed to use quantum key distribution (QKD) to allow two distant parties to share a key in an information theoretic secure way that is guaranteed by the laws of physics. Significant progress has been carried out in recent years on implementing this over fibre. However, the loss experienced over terrestrial links severely limits the achievable distance. By utilising the negligible loss experienced by photons travelling through most of the atmosphere, satellite based QKD can overcome these limitations and enable inter-continental QKD.

Single photon avalanche photodiodes (SPADs) are often the detector of choice for QKD due to their affordability, small footprint and ability to operate at temperatures easily reachable by thermoelectric cooling (or room temperature). However, there are problems in using SPADs at high QKD repetition rates because SPADs suffer from finite timing resolution/jitter, which also manifests itself in long detector response 'tails'. The poor timing resolution of SPADs generally precludes operation at high QKD repetition rates due to the increased probability of detection events being registered at incorrect times, thus contributing unworkably large error rates.

The embodiments described below are not limited to implementations which solve any or all of the problems of the known approaches described above.

SUMMARY

This Summary is provided to introduce a selection of concepts in a simplified form that are further described below in the Detailed Description.

According to a first aspect, a receiver is configured to receive an optical signal from a transmitter in an optical communication system, the receiver comprising: at least a first and a second signal detection unit for detecting detection events associated with single photons; at least one optical switch configured to alternate between engaging at least a first switch position and a second switch position, the first switch position being arranged to direct a received optical signal to the first signal detection unit and the second switch position being arranged to direct a received optical signal to the second signal detection unit, such that the first and second signal detection units correspond to the first and second switch positions respectively; a detection time tagger configured to tag the detection events at the first and second signal detection units according to time, switch position, and signal detection unit, thereby introducing a correlation between a time period in which a detection event is registered, the switch position, and the signal detection unit; and a timing recovery module connected to the detection time tagger, wherein the timing recovery module is configured to: use the correlation to verify whether or not a detection event has been tagged in the correct time period, and, if a detection event is found to be tagged in the incorrect time period, re-assign the detection event to the correct time period.

Preferably, the timing recovery module is configured to re-assign the detection event to the correct time period when: the switch position tagged for the detection event is the first switch position, and the signal detection unit for the detection event is the second signal detection unit; or when the switch position tagged for the detection event is the second switch position, and the signal detection unit tagged for the detection event is the first signal detection unit.

Preferably, the time period corresponds to a time-bin, wherein the timing recovery module is configured to re-assign the detection event, found to be tagged in the incorrect time period, by reassigning the detection event to a previous time bin.

Preferably, the detection time tagger is further configured to tag each detection event of the detection events with the encoding of photons in associated with each respective detection event.

Preferably, the receiver further comprises at least a first and second optical decoding system, wherein the at least one optical switch is configured to: direct, when the optical switch is engaged at the first switch position, the received optical signal through the first optical decoding system to produce a first decoded optical signal; and direct the first decoded optical signal to the first signal detection unit for detecting detection events; and when the optical switch is engaged at the second switch position, direct the received optical signal through a second optical decoding system to produce a second decoded optical signal; and direct the second decoded optical signal to the second signal detection unit for detecting detection events.

Preferably, the at least one optical switch is configured to alternate between engaging at least the first switch position and the second switch position at a rate equal to a repetition rate of the received optical, such that the alternating of the at least one optical switch between the first and second switch positions is synchronised with the repetition rate of the received optical signal.

Preferably, the repetition rate of the received optical signal is calculated based on a repetition rate of a corresponding transmitted optical signal, transmitted from a transmitter to the receiver, adjusted according to a Doppler shift correction factor.

Preferably, the at least one optical switch is configured to alternate independent of the wavelength and encoding of photons in the received optical signal.

Preferably, the receiver further comprises a driver for driving the switch, such that the alternating of the at least one optical switch between the first and second switch positions is synchronised with the repetition rate of the received optical signal entering the at least one optical switch.

Preferably, the first and second signal detection units each comprise a plurality of single photon detectors.

Preferably, the first and second signal detection units each comprise four single photon detectors.

Preferably, the single photon detectors are SPADs.

Preferably, the receiver is a ground-based receiver.

Preferably, the receiver further comprises a plurality of optical switches, wherein each of the plurality of optical switches is configured to alternate between engaging a first respective switch position and a second respective switch position, and wherein each of the plurality of optical switches is associated with a first and second respective signal detection unit that are independent for each optical switch.

Preferably, the at least one optical switch is configured to alternate between a plurality of switch positions, each of the plurality of switch positions being associated with a respective signal detection unit of a plurality of signal detection units.

According to a second aspect, there is provided a method of operating an optical communication system, the method comprising, at a receiver: receiving an optical signal; alternating at least one optical switch between engaging at least a first switch position and a second switch position, directing, when the optical switch is engaged at the first switch position, the received optical signal to a first signal detection unit; directing, when the optical switch is engaged at the second switch position, the received optical signal to a second signal detection unit, such that the first and second signal detection units correspond to the first and second switch positions respectively; detecting detection events at the first and second signal detection units; tagging the detection events at the first and second signal detection units according to time, switch position, and signal detection unit, thereby introducing a correlation between a time period in which a detection event is registered, the switch position, and the signal detection units; and using the correlation to verify whether or not a detection event has been tagged in the correct time period, and if a detection event is found to be tagged in the incorrect time period, re-assigning the detection event to the correct time period.

Preferably, the re-assigning the detection event to the correct time period occurs when: the switch position tagged for the detection event is the first switch position, and the signal detection unit for the detection event is the second signal detection unit; or when the switch position tagged for the detection event is the second switch position, and the signal detection unit tagged for the detection event is the first signal detection unit.

Preferably, the time period corresponds to a time-bin, and reassigning the detection event, found to be tagged in the incorrect time period, includes reassigning the detection event to a previous time bin.

Preferably, the method is performed at the receiver as defined in the first aspect above.

Preferably, tagging detection events further comprises tagging detection events with encodings of photons associated with the detection events.

Preferably, the directing, when the optical switch is engaged at the first switch position, the received optical signal to a first signal detection unit further comprises: directing the received optical signal through a first optical decoding system to produce a first decoded optical signal; and directing the first decoded optical signal to the first signal detection unit for detecting detection events; and wherein the directing, when the optical switch is engaged at the second switch position, the received optical signal to a second signal detection unit further comprises: directing the received optical signal through a second optical decoding system to produce a second decoded optical signal; and directing the second decoded optical signal to the second signal detection unit for detecting detection events.

Preferably, alternating the at least one optical switch between engaging the at least first switch position and the second switch position occurs at a rate equal to a repetition rate of the received optical, such that the alternating of the at least one optical switch between the first and second switch positions is synchronised with the repetition rate of the received optical signal.

Preferably, the method further includes calculating the repetition rate of the received optical signal based on a repetition rate of a corresponding transmitted optical signal, transmitted from a transmitter to the receiver, adjusted according to a Doppler shift correction factor.

Preferably, alternating the at least one optical switch is independent of a wavelength and encoding of photons in the received optical signal.

According to a third aspect, there is provided an optical communication system comprising a transmitter and a receiver according to the first aspect above.

Preferably, at least one of the transmitter and the receiver is ground-based or at least one of the transmitter and the receiver is a satellite.

According to a fourth aspect, a computer-readable medium comprising code or computer instructions stored thereon, which when executed by a processor, causes the processor to perform the method according to the second aspect above.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figures 1, 2:
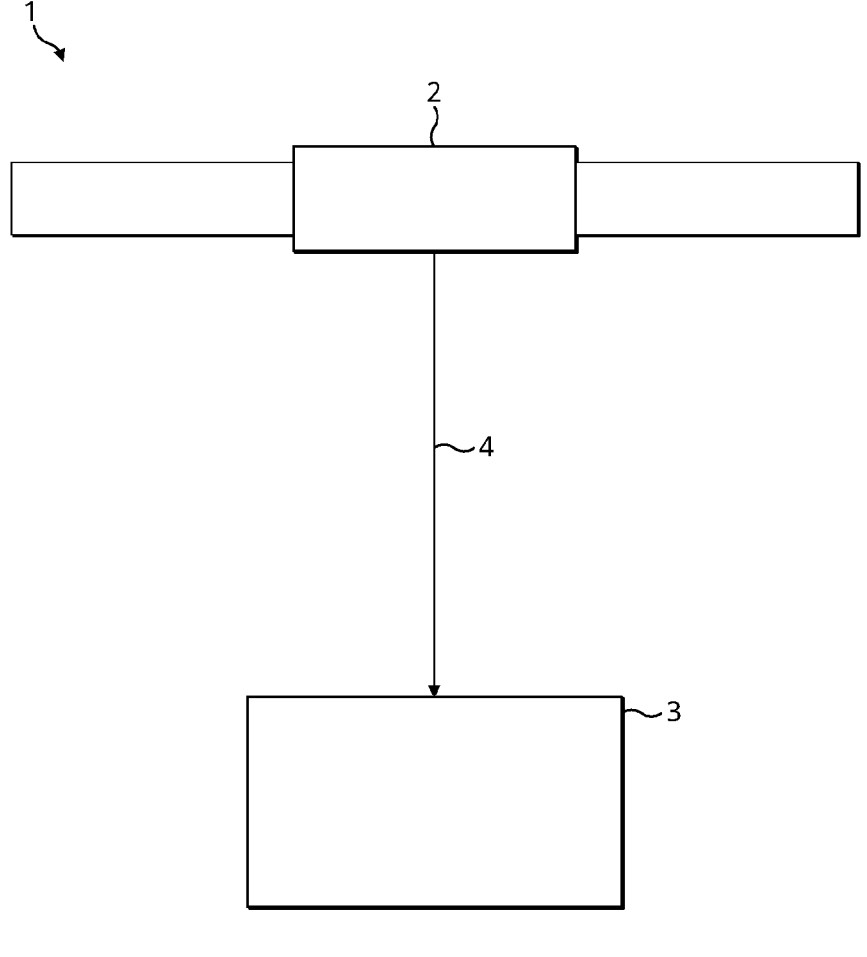
FIG. 1 is a schematic diagram illustrating a satellite quantum key distribution system according to an embodiment of the invention.
FIG. 2 is a schematic diagram illustrating a pulse generator for generating single photons or weak coherent pulses.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a schematic overview of a part of an optical communication system. In one embodiment, the optical communication system 1 is a Quantum Key Distribution (QKD) system.

As shown in FIG. 1, a satellite based optical communication system 1 comprises a transmitter 2 located on a satellite and a receiver 3 located on the ground. During a communication session, the transmitter 2 sends a quantum beam 4 comprising a series of single photons or weak laser pulses down to the receiver 3 with a particular repetition rate. In the illustrated example the quantum beam 4 comprises a series of laser pulses attenuated to the single-photon level. When the receiver 3 detects the laser pulses, these detection events are time-stamped by the receiver 3. The receiver 3 and the transmitter 2 then perform several post-processing steps. However, this requires the two parties (e.g. transmitter 2 and receiver 3) to ensure they are comparing the same corresponding bits, such that the identification (ID) of every photon at the receiver 3 matches the photon ID at the transmitter 2. The photon IDs are the temporal labels for photon transmission and detection events.

Thus, for the transmitter 2 and the receiver 3 to perform the post-processing steps to turn raw detection events into a secure key, the transmitter 2 and the receiver 3 need to be very closely synchronised. This means that the transmitter 2 and the receiver 3 must be able to match the sending event of a laser pulse at the transmitter 2 to the detection event of the same laser pulse at the receiver 3. This requires detectors of the receiver 3 to have sufficiently precise timing resolution that they can consistently correctly measure detection events in a time-bin corresponding to the sending of laser pulses by the transmitter 2.

One of the limiting factors for achieving high repetition rate is detector resolution. In other words, for a communication system 1 operating, for example, at 2 GHz the uncertainty in the response time of the detector, that is, the uncertainty in the time difference between a photon impinging on the detector and that detector registering a detection event, should be no more than 500 ps, so that the detection event can be matched to the correct corresponding photon emission event at the transmitter, taking into account the time of flight, or travel time, of the photon between the transmitter 2 and the receiver 3 and the expected response time of the detector. Single photon avalanche photodiodes (SPADs) are often the detector of choice for communications systems that use single photons (e.g. QKD) due to their affordability, small footprint and ability to operate at temperatures easily reachable by thermoelectric cooling (or room temperature). However, SPADs suffer from finite timing resolution/jitter, which also manifests itself in long detector response 'tails'. State-of-the-art SPADs have time-differences in response time that can extend over a relatively long period, for example, several 500 ps time-bins. This poor timing resolution may make it difficult for the ground receiver and satellite transmitter to consistently correlate the sent and detected events for later post-processing.

Improving detector timing resolution is a non-trivial problem, and often comes with the penalty of reduced detection efficiency. Therefore, it is desirable to reduce the impact of detector timing resolution.

The present disclosure provides means to increase the effective timing resolution of the SPADs, thus allowing higher repetition rates for optical communication system, without requiring significant detector advancements or utilisation of expensive and complex detector technology.

It will be understood that in practice the satellite based optical communication system 1 has many additional elements which are not shown in FIG. 1, and will not be described herein. FIG. 1 is merely an explanatory diagram to assist in explaining the requirement for increasing the repetition rate of the optical link between the transmitter 2 and the receiver 3.

In the illustrated embodiment, the transmitter 2 is a satellite and the receiver 3 is an optical ground receiver (OGR) at a ground station. However, it is to be understood that the transmitter 2 and receiver 3 may each terrestrially based, as part of a terrestrial communication system, or may both be located on satellites. Similarly, the transmitter 2 may be terrestrially based and the receiver 3 may be a satellite. In the illustrated embodiment the quantum beam 4 travels through free space between the transmitter 2 and the receiver 3. In other examples the quantum beam may travel through optical fibre(s) between the transmitter and receiver.

An overview of the present disclosure is for the receiver 3 to use one or more optical switches, in combination with parallel photon detection systems or chains, to improve the timing resolution of the overall detection system. A correlation between the switching instances of the optical switch and the time period, such as a time-bin, of the detection event is introduced, which can used to correlate the photon emission and detection events, for example by re-assigning photon detection events to the correct time period/time-bin.

In FIG. 2, the transmitter 2 comprises a pulse generator 6, which produces a series of faint laser pulses at a particular wavelength to form the quantum beam 4. The optical pulse generator 6 comprises a faint photon source (FPS) 8 controlled by FPS electronics 10. In the illustrated example, the FPS 8 generates faint laser pulses, which are attenuated to single photon-level events to form the quantum beam 4 suitable for use in, for example, QKD protocols. In some other examples, the FPS 8 may be replaced with a single photon source. In the illustrated example, the QKD system 1 operates using the BB84 polarisation encoding protocol. However, it can be appreciated that other QKD protocols may be employed, such as those using time-bin or phase encoding.

Figure 3:
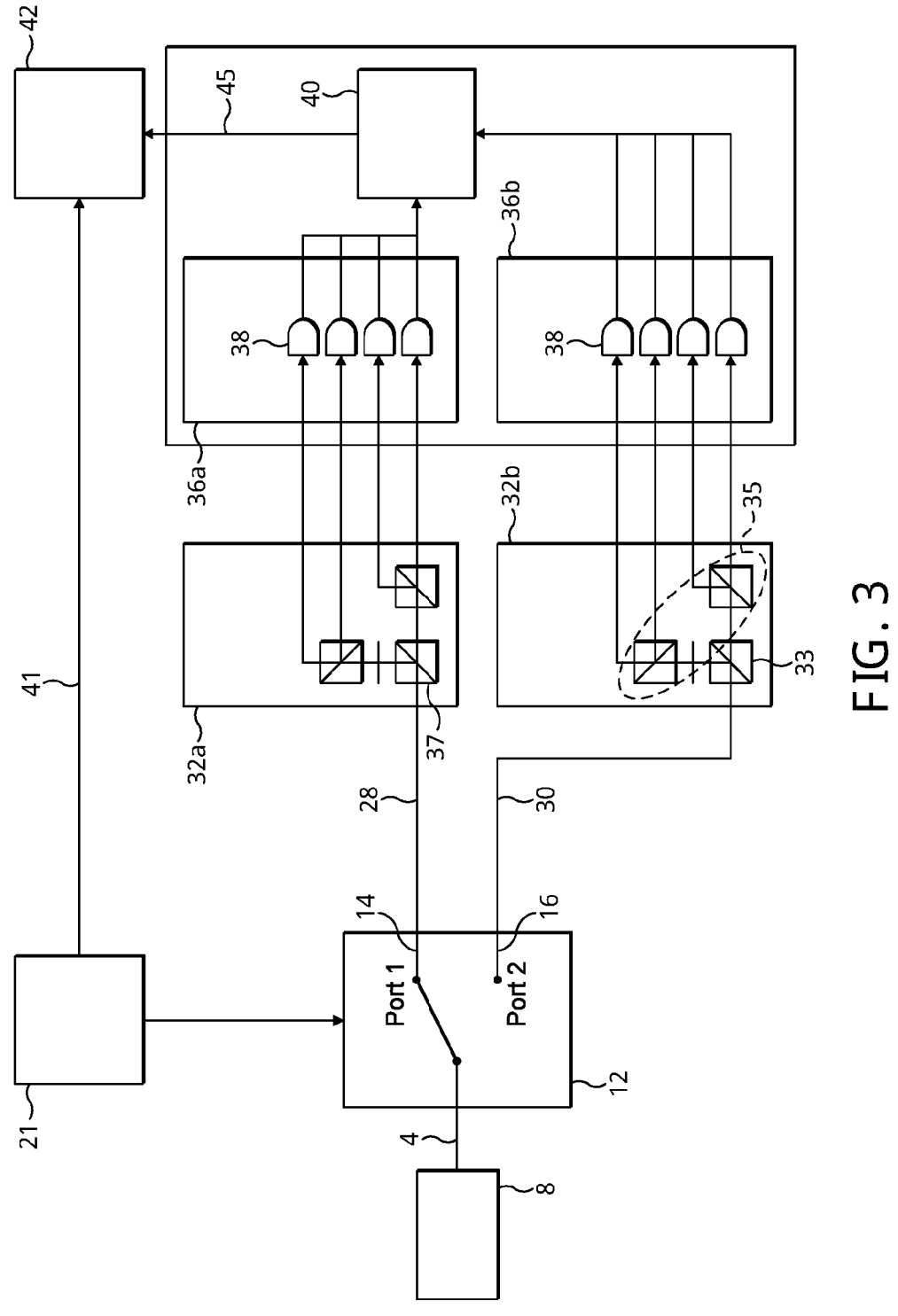
FIG. 3 is a schematic diagram illustrating a QKD receiver according to an embodiment of the present invention.

FIG. 3 shows a receiver 3 of the QKD system 1 according to an embodiment of the present invention. The receiver 3 receives a quantum beam 4 from an FPS 8 located at a transmitter, which may be a satellite transmitter (not shown in FIG. 3). The quantum beam 4 is directed to an optical switch 12, which routes the photons of the quantum beam 4 to separate and parallel decoding optical systems 32a and 32b independently of the wavelength or polarisation, as shown. The switch 12 is connected to a driver 21, which drives the switch 12 at a desired repetition rate. An example of a high speed switch that may be used in the present application is given in the paper by A. ALARCÓN et al[1]. To summarise, such a switch works on a principle is based on a Sagnac interferometer that houses a Mach-Zehnder interferometer. Incoming light of an arbitrary polarisation enters the Sagnac interferometer and is split by a beam splitter to produce two optical beams |A> and |B>. The Mach-Zehnder decomposes each beam |A> and |B> into orthogonal polarisation components, where one of the polarisation components is rotated 90° relative to the other (rotated using a half-wave plate). The Mach-Zehnder houses two optical phase modulators, such that the orthogonal components |A> and |B> pass through separate phase modulators, before being combined again at an output of the Mach-Zehnder interferometer. The voltage applied to the phase modulators governs through which port (of the optical switch 12) the combined beams emerge. However, other suitable types of high speed optical switch may also be used.

In the illustrated embodiment, the switch 12 has two outputs ports 14, 16. The two output ports 14, 16 represent a first and second switch position respectively, whereby the switch 12 is configured to switch between engaging the first switch position and the second switch position. The driver 21 synchronises the switching of the switch 12 to the repetition rate of the quantum beam 4, such that the switch 12 routes consecutive photons of the quantum beam 4 to different optical paths to produce two output beams 28, 30 from output ports 14 and 16, as shown. In particular any clock or clock signal (not shown) driving the switch 12 should be matched to the repetition rate of the quantum beam 4 entering the switch 12. The repetition rate may be the photon emission rate corrected for any Doppler shift at the receiver 3, as explained below. In the example shown in FIG. 3, the repetition rate of the switch is configured to be at 2 GHz to match the repetition rate of the quantum beam 4. This results in two outputs beams 28, 30 each having half the repetition rate of the original quantum beam 4. The two output beams 28, 30 are directed to respective ones of two different decoding optical systems 32a and 32b, as shown.

Additionally, taking satellite QKD as an example, the repetition rate of the received quantum beam 4 at the transmitter is generally changing relative to the repetition rate of the transmitted quantum beam 4 at the transmitter due to Doppler shift as the satellite moves, hence the rate of switching must also be changed to match this change and correspond to the repetition rate of the quantum beam received at the receiver. In this case, the change in repetition rate between the source and receiver 3, can be recovered from a dedicated synchronisation laser or from the detected photons themselves, for example, as described in the applicants co-pending patent application GB2104318.7. This can be used to provide feed forward control correcting for changes to repetition rate.

In an alternative embodiment, the switch 12 can comprise N output ports to produce N output beams instead of two, each directed to a separate decoding optical system 32, whereby the repetition rate of the each output beam is 1/N the repetition rate of the quantum beam 4. In this case, the receiver 3 will need to accommodate N decoding optical systems 32, such that each output beam is directed to a separate decoding system 32. In other words, the switch 12 can engage a plurality of N switch positions. Alternatively or additionally, multiple switches 12 can be cascaded one after another to form a network of switches. Each of these switches can comprise a plurality of output ports. In this configuration, each output beam produced from an output port of a previous switch is directed to an input port of a switch ahead of it, such that a further reduction in the repetition rate of the original quantum beam 4 is achieved. In such embodiments the network of switches can comprise M output ports to produce M output beams instead of two, each directed to a separate decoding optical system 32, whereby the repetition rate of the each output beam is 1/M the repetition rate of the quantum beam 4. In this case, the receiver 3 will need to accommodate M decoding optical systems 32, such that each output beam is directed to a separate decoding system 32.

In the illustrated example of FIG. 3, each decoding optical system 32a and 32b is arranged to decode the quantum beams 28, 30 according to the BB84 polarisation encoding protocol, and so each decoding optical system 32a and 32b is a polarisation analyser. In the BB84 polarisation encoding protocol, the photons assume one of four linear polarisation states: H, V, A and D. Each decoding optical system 32a and 32b comprises a non-polarising beamsplitter 33, two polarising beamsplitters 35 and a halfwave plate 37 arranged to provide photons have respective ones of the four linear polarisation states: H, V, A and D as outputs to respective ones of four single photon detector units 38. The first beam splitter 33 of each decoding optical system 32 is non-polarising, and so randomly selects a measurement basis of each photon (i.e. either H/V or A/D basis). The next two polarising beam splitters 35, are polarising, and so separate the photons according to their polarisation. One of the arms of each decoding optical system 32 also comprises a half-wave plate 37 between the beamsplitter 33 and one of the polarising beamsplitters 35, which rotates the plane of polarisation such that the corresponding polarising beam splitter 35 can correctly separate the photons according to their polarisation.

Each decoding optical system 32a and 32b then directs photons to respective separate single photon detection units 36a and 36b. Each single photon detection unit 36a and 36b comprises a plurality of signal photon detectors 38. In the embodiment shown FIG. 3, each single photon detection unit 36 comprises four single photon detectors 38, which is required to decode the photons according to the BB84 polarisation encoding protocol. However, it can be appreciated that in other examples different numbers of single photons detectors 38 may be used, depending on how the incoming photons are encoded. Thus, a photon corresponding to a first switch position will be directed by the switch 12 to detection unit 36a (via port 14). Similarly, a photon corresponding to a second switch position will be directed by the switch 12 to detection unit 36b (via port 16). In this manner, the switch position is correlated to the appropriate single photon detection unit 36.

With the configuration shown in FIG. 3, the effective time bin periods of the system 1 are doubled. The reason for this is as follows. Consider a situation where only a single detection unit 36 is used (e.g. only 36a is used), and without any optical switches. In this configuration, there is a possibility that two photon detection events are registered in the same time period (by two separate detectors 38), as a result of the limitation put by the timing resolution of the detectors 38. In this case, it would not be possible to tell which photon detection event belongs to which time period, thus introducing an error in the system 1. For example, if the photons are emitted at 2 GHZ (nominally every 500 ps), then if one of the detectors 38 registers a detection event, say, 700 ps after receiving the photon (and the other detector 38 registers an event within 500 ps after the photons hitting the detector 38), then both detection events will be registered in the same time period. In this case, it will be unclear which detection event corresponds of the most recently emitted photon, and which detection event corresponds to the photon emitted photon before that.

By using two detection units 36a and 36b, a correlation is introduced between the switch position and the detection units 36a and 36b, and so even if two detection events are registered in the same time period but in different detection units 36, later post-processing is able to re-assign the detection event (registered in the incorrect time period) to the correct time period using this correlation, as will be described below.

Additionally, the arrangement shown in FIG. 3 eliminates the possibility of two consecutive photons (having the same polarisation) hitting the same detector 38 (located in the same detection unit 36a or 36b), which could result in only a single detection event being registered.

The outputs of each single photon detector 38 is provided to a detector time tagger 40, which is connected to the timing recovery computer 42. In the embodiment shown in FIG. 3, the receiver 3 comprises only a single time tagger 40. However, receiver 3 can also accommodate multiple time taggers 40, one for each single photon detection unit 38, and in which all share the same local clock.

In the embodiment shown in FIG. 3, the time-tagger 40 has eight channels, corresponding to the total of eight single photon detectors 38 of the receiver 3. As mentioned before, each detection unit 36 has four single photon detectors 38. This is to detect photons with H, V, A, D polarisations separately in each detection unit 38, such that H, V, A, D polarisations are separately identified at the time tagger 40.

Each channel of the time-tagger 40 time stamps the single photon reception events detected by the single photon detectors 38 using a clock signal from a receiver 3 local clock (not shown). Additionally, the time tagger 40 also tags each detection event according to photon encoding (e.g. according to polarisation), as well as which detection unit 36 the event is registered in (in the example shown in FIG. 3, this could be detection unit D1 or D2). This information is subsequently communicated to a timing recovery computer 42 via a communication link 45. Simultaneously, the driver 21 also communicates the switch position of the switch 12 at different times to the timing recovery computer 42 via a communication link 41. The timing recovery computer 42 then assigns the switch position to each detection event.

Figure 4:
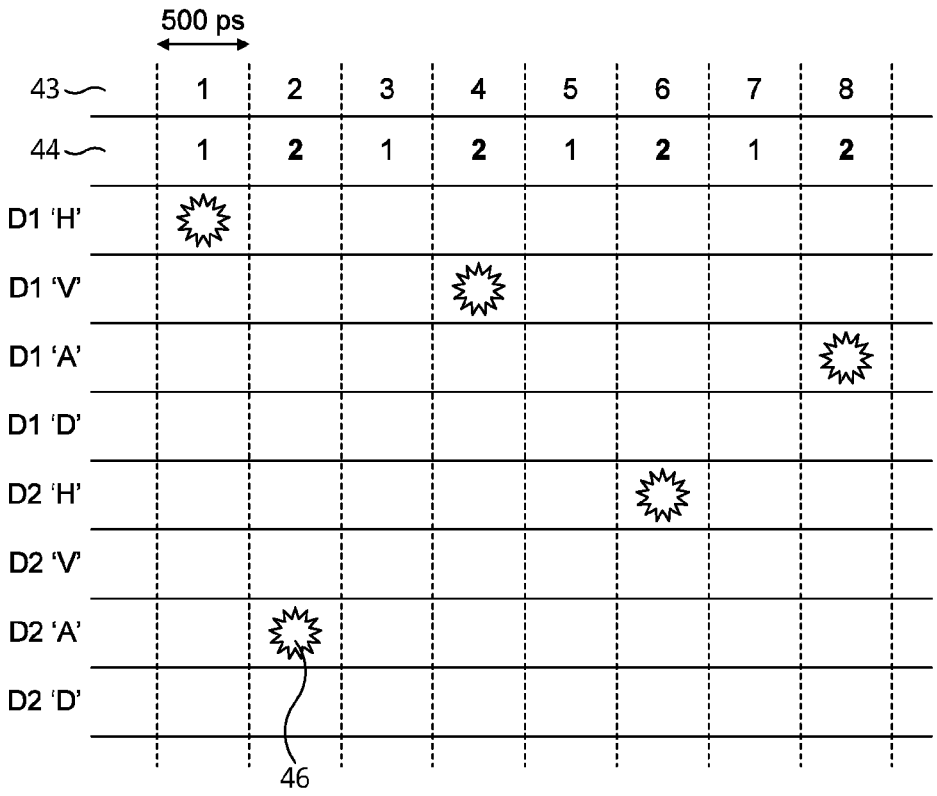
FIG. 4 is a chart illustrating the tagging of single photon detection events according to an embodiment of the present invention.

FIG. 4 shows a chart of how the single photon reception events are tagged, and registered a correct time bin using the timing recovery computer 42. The first row 43 of the chart indicates the time bin which is related to the repetition rate of the system. For a 2 GHz system, for example, the bins are 500 ps wide. The second row 44 indicates the switch position (i.e. position 1 or 2). For example, switch position 1 produces the output beam 28 to a detection unit D1, and switch position 2 produces the output beam 30 to a detection unit D2. The subsequent rows in FIG. 4 indicate which single photon detection unit 36 the photon detection event is registered in (i.e. D1 or D2), and the photon polarisation (H, V, A or D).

The stars 46 indicate when a detection has taken place. For example, in time bin 1, the receiver records a photon reception corresponding to switch position 1 and with polarisation H at detection unit D1. The switch position, detection unit (D1 or D2), and photon polarisation information are communicated to the timing recovery computer 42, which tags the photon detection event with time bin 1, D1, and H. Likewise, in time bin 2, the receiver 3 records a photon reception corresponding to switch position 2, and polarisation A, at detection unit D2, hence the timing recovery computer 42 tags this photon detection event with time bin 2, D2, and A.

In time bin 4 the receiver records a photon reception corresponding to switch position 2 and with polarisation V at detection unit D1. The switch position, detection unit, and photon polarisation information are communicated to the timing recovery computer 42. The timing recovery computer 42 is aware that the indicated combination of time bin 4 and detection unit D1 is not possible because the switch is in position 2 during time bin 4, so that photons can only be received by detection unit D2, and not by detection unit D1, during time bin 4. Accordingly, this photon reception event must have taken place during the preceding time bin 3 when the switch was in position 1 so that photons could be received by the detection unit D1. Accordingly, the timing recovery computer corrects the indicated time bin and tags the photon detection event with time bin 3, D1, and V.

Similarly, the timing recovery computer 42 tags a further photon detection event with time bin 6, D2, and H, and corrects the final photon detection event recorded in time bin 8, and tags it with time bin 7, D1, and A.

Thus, the key to this invention is to use a correlation introduced between the time bin, the switching position, and the detection units D1 and D2 (see FIG. 3), to accurately re-assign photon detection events to the correct time-bin, should an event be registered in an incorrect time bin. For example, for time bin 4, a photon detection event is registered corresponding to switch position 2 (and having polarisation V), but tagged with detection unit D1, instead of D2. This indicates that the photon in fact arrived in time bin 3, when the switch 12 was in position 1, but due to the timing resolution of the detector 38 it was incorrectly registered in time bin 4. Additionally, as with existing systems, if, after reassignment, two detectors 28 receive photons at the same time (in the same time bin), one photon reception event is randomly chosen for use and the other discarded.

Therefore, the effective length of time in which a recorded photon reception event can be unambiguously correlated or matched to a specific photon emission is doubled from, for example, 500 ps (which is the intrinsic timing resolution of the detectors 38) to 1000 ps by using a two port switch 12, improving the timing resolution of the receiver. This may be regarded as doubling the length of the time bins used at the receiver. As mentioned previously, multiple switches can be used in a cascading manner, each of which comprising multiple output ports. This will produce a plurality of output beams, each requiring its own single photon detection unit 36 to tag the photon detection events of the output beams. In such a system, the effective timing resolution of the QKD system 1 is increased even further, proportional to the total number of output beams as a result of the switches.

Figure 5:
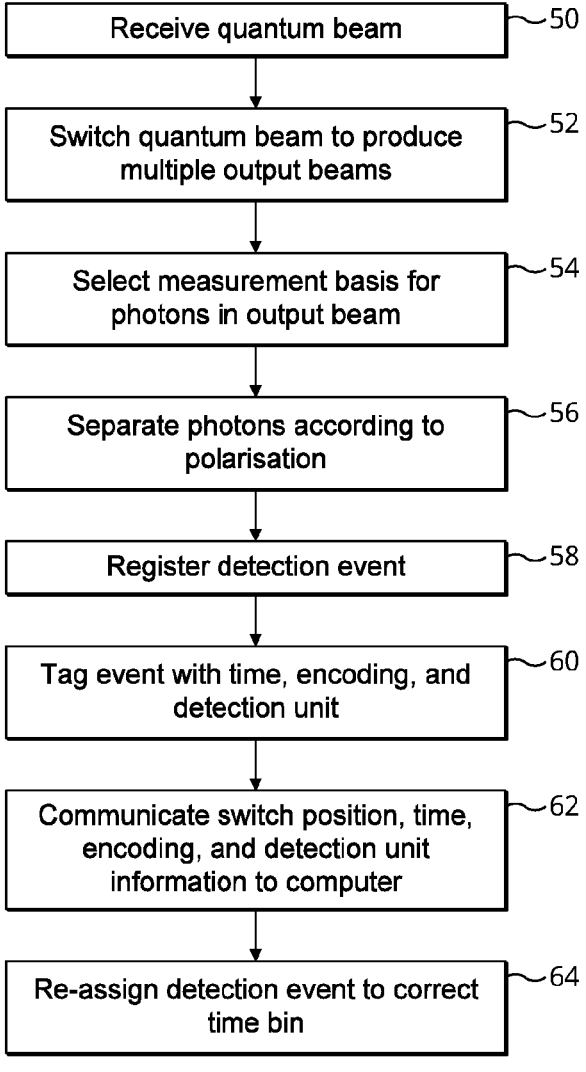
FIG. 5 is a flowchart illustrating the method implemented by the QKD system according to an embodiment of the present invention.

FIG. 5 shows a flow chart of method implemented by the QKD system 1 according to an embodiment of the present invention. At step 50, the receiver 3 receives a quantum beam from a faint photon source 8 located at a transmitter. At step 52, the quantum beam passes through one or more optical switches (located at the receiver 3), such that the quantum beam is optically switched to produce a plurality of output beams. Each output beam is then routed to separate decoding optical system 36, where the decoding optical system 36 randomly selects 54 a measurement basis of each photon (e.g. H/V or A/D). The photons of each output beam are separated 56 according to their encoding/polarisation by two polarising beam splitters 35 of each decoding optical system 36, and routed to separate single photon detectors 38. The single photon detectors 38 then register 58 each photon detection event, and the time-tagger 40 tags 60 each event according to time (time-bin), encoding, and the detection unit (e.g. D1 or D2), and this information is communicated 62 to the timing recovery computer 42. Simultaneously, the switch position is also communicated 62 by the driver 21 to the timing recovery computer 42, thus introducing a correlation between the switch position and time-bin. By using this correlation, if an event is found to be registered in an incorrect time bin based on the combination of time-bin, detection unit and switch position, the timing recovery computer 42 re-assigns 64 the event into the correct time bin.

In the embodiments described above the faint pulses are single photon events. In other examples, these may be multi-photon events.

In the embodiments described above the faint pulses are single photon events comprising a series of laser pulses attenuated to the single-photon level. In other examples, other methods of producing the faint pulses may be used.

In the embodiments described above the times are recorded as time-bins. In other examples different periods of time may be used.

In the embodiments described above the system comprises a single optical ground receiver (receiver). The system may comprise any number of receivers.

In the embodiments described above the system comprises a single satellite. The system may comprise any number of satellites.

In the embodiments described above, each of the transmitter and the receiver includes a single dichroic mirror to combine and separate the different optical beams. In other examples, different beam combining or separating arrangements may be used.

In the embodiments described above, specific laser wavelengths and pulse repetition rates are used. In other examples, different wavelengths and/or pulse repetition rates may be used.

In the embodiments described above the system is a quantum key distribution system. In other examples other cryptographic items could be distributed/delivered in addition to, or as an alternative to, encryption keys. Examples of such other cryptographic items include cryptographic tokens, cryptographic coins, or value transfers.

In the described embodiments of the invention parts of the system may be implemented as a form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. For example, the tagging of the photons reception events according to time-bin 43 (i.e. using time tagger 40), and the post-processing steps done by the computer 42 are all implemented in software. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although illustrated as a single system, it is to be understood that a system may be a distributed system.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of preferred embodiments is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A receiver configured to receive an optical signal from a transmitter in an optical communication system, the receiver comprising:
   at least a first and a second signal detection unit for detecting detection events associated with single photons;
   at least one optical switch configured to alternate between engaging at least a first switch position and a second switch position, the first switch position being arranged to direct a received optical signal to the first signal detection unit and the second switch position being arranged to direct a received optical signal to the second signal detection unit, such that the first and second signal detection units correspond to the first and second switch positions respectively;
   a detection time tagger configured to tag the detection events at the first and second signal detection units according to time, switch position, and signal detection unit, thereby introducing a correlation between a time period in which a detection event is registered, the switch position, and the signal detection unit; and
   a timing recovery module connected to the detection time tagger, wherein the timing recovery module is configured to:
      use the correlation to verify whether or not a detection event has been tagged in the correct time period, and, if a detection event is found to be tagged in the incorrect time period,
      re-assign the detection event to the correct time period.

2. The receiver of claim 1, wherein the timing recovery module is configured to re-assign the detection event to the correct time period when:
   the switch position tagged for the detection event is the first switch position, and the signal detection unit for the detection event is the second signal detection unit; or
   when the switch position tagged for the detection event is the second switch position, and the signal detection unit tagged for the detection event is the first signal detection unit.

3. The receiver according to claim 1, wherein the time period corresponds to a time-bin, wherein the timing recovery module is configured to re-assign the detection event, found to be tagged in the incorrect time period, by reassigning the detection event to a previous time bin.

4. The receiver according to claim 1, wherein the detection time tagger is further configured to tag each detection event of the detection events with the encoding of photons in associated with each respective detection event.

5. The receiver according to claim 1, further comprising at least a first and second optical decoding system, wherein the at least one optical switch is configured to:
   direct, when the optical switch is engaged at the first switch position, the received optical signal through the first optical decoding system to produce a first decoded optical signal; and
   direct the first decoded optical signal to the first signal detection unit for detecting detection events; and
   when the optical switch is engaged at the second switch position, direct the received optical signal through a second optical decoding system to produce a second decoded optical signal; and
   direct the second decoded optical signal to the second signal detection unit for detecting detection events.

6. The receiver of claim 1, wherein the at least one optical switch is configured to alternate between engaging at least the first switch position and the second switch position at a rate equal to a repetition rate of the received optical, such that the alternating of the at least one optical switch between the first and second switch positions is synchronised with the repetition rate of the received optical signal.

7. The receiver of claim 6, wherein the repetition rate of the received optical signal is calculated based on a repetition rate of a corresponding transmitted optical signal, transmitted from a transmitter to the receiver, adjusted according to a Doppler shift correction factor.

8. The receiver according to claim 1, wherein the at least one optical switch is configured to alternate independent of the wavelength and encoding of photons in the received optical signal.

9. The receiver according to claim 1, wherein the first and second signal detection units each comprise a plurality of single photon detectors.

10. The receiver according to claim 9, wherein the first and second signal detection units each comprise four single photon detectors.

11. The receiver according to claim 9, wherein the single photon detectors are SPADs.

12. The receiver according to claim 1, wherein the receiver is a ground-based receiver.

13. The receiver of claim 1, comprising a plurality of optical switches, wherein each of the plurality of optical switches is configured to alternate between engaging a first respective switch position and a second respective switch position, and wherein each of the plurality of optical switches is associated with a first and second respective signal detection unit that are independent for each optical switch.

14. The receiver of claim 1, wherein the at least one optical switch is configured to alternate between a plurality of switch positions, each of the plurality of switch positions being associated with a respective signal detection unit of a plurality of signal detection units.

15. A method of operating an optical communication system, the method comprising, at a receiver:

receiving an optical signal;

alternating at least one optical switch between engaging at least a first switch position and a second switch position, directing, when the optical switch is engaged at the first switch position, the received optical signal to a first signal detection unit;

directing, when the optical switch is engaged at the second switch position, the received optical signal to a second signal detection unit, such that the first and second signal detection units correspond to the first and second switch positions respectively;

detecting detection events at the first and second signal detection units;

tagging the detection events at the first and second signal detection units according to time, switch position, and signal detection unit, thereby introducing a correlation between a time period in which a detection event is registered, the switch position, and the signal detection units; and using the correlation to verify whether or not a detection event has been tagged in the correct time period, and if a detection event is found to be tagged in the incorrect time period, re-assigning the detection event to the correct time period.

16. The method of claim 15, wherein the re-assigning the detection event to the correct time period occurs when:

the switch position tagged for the detection event is the first switch position, and the signal detection unit for the detection event is the second signal detection unit; or when the switch position tagged for the detection event is the second switch position, and the signal detection unit tagged for the detection event is the first signal detection unit.

17. The method of claim 15, wherein the time period corresponds to a time-bin, and reassigning the detection event, found to be tagged in the incorrect time period, includes reassigning the detection event to a previous time bin.

18. The method of claim 15, wherein tagging detection events further comprises tagging detection events with encodings of photons associated with the detection events.

19. The method of claim 15, wherein the directing, when the optical switch is engaged at the first switch position, the received optical signal to a first signal detection unit further comprises:

directing the received optical signal through a first optical decoding system to produce a first decoded optical signal; and directing the first decoded optical signal to the first signal detection unit for detecting detection events;

and wherein the directing, when the optical switch is engaged at the second switch position, the received optical signal to a second signal detection unit further comprises:

directing the received optical signal through a second optical decoding system to produce a second decoded optical signal; and directing the second decoded optical signal to the second signal detection unit for detecting detection events.

20. The method of claim 15, wherein alternating the at least one optical switch between engaging the at least first switch position and the second switch position occurs at a rate equal to a repetition rate of the received optical, such that the alternating of the at least one optical switch between the first and second switch positions is synchronised with the repetition rate of the received optical signal.

21. The method of claim 20, further comprising:

calculating the repetition rate of the received optical signal based on a repetition rate of a corresponding transmitted optical signal, transmitted from a transmitter to the receiver, adjusted according to a Doppler shift correction factor.

22. An optical communication system comprising:

a transmitter; and a receiver configured to receive an optical signal from the transmitter, the receiver comprising:

at least a first and a second signal detection unit for detecting detection events associated with single photons;

at least one optical switch configured to alternate between engaging at least a first switch position and a second switch position, the first switch position being arranged to direct a received optical signal to the first signal detection unit and the second switch position being arranged to direct a received optical signal to the second signal detection unit, such that the first and second signal detection units correspond to the first and second switch positions respectively;

a detection time tagger configured to tag the detection events at the first and second signal detection units according to time, switch position, and signal detection unit, thereby introducing a correlation between a time period in which a detection event is registered, the switch position, and the signal detection unit; and a timing recovery module connected to the detection time tagger, wherein the timing recovery module is configured to:

use the correlation to verify whether or not a detection event has been tagged in the correct time period, and, if a detection event is found to be tagged in the incorrect time period, re-assign the detection event to the correct time period.

23. The optical communication system of claim 22, wherein at least one of the transmitter and the receiver is ground-based or wherein at least one of the transmitter and the receiver is a satellite.

24. A non-transitory computer-readable storage medium comprising code or computer instructions stored thereon, which when executed by a processor, causes the processor to, upon a receiver receiving an optical signal:

alternate at least one optical switch between engaging at least a first switch position and a second switch position, direct, when the optical switch is engaged at the first switch position, the received optical signal to a first signal detection unit;

direct, when the optical switch is engaged at the second switch position, the received optical signal to a second signal detection unit, such that the first and second signal detection units correspond to the first and second switch positions respectively;

detect detection events at the first and second signal detection units;

tag the detection events at the first and second signal detection units according to time, switch position, and signal detection unit, thereby introducing a correlation between a time period in which a detection event is registered, the switch position, and the signal detection units; and use the correlation to verify whether or not a detection event has been tagged in the correct time period, and if a detection event is found to be tagged in the incorrect time period, re-assigning the detection event to the correct time period.

* * * * *